US007731114B2

(12) United States Patent
Domlatil

(10) Patent No.: US 7,731,114 B2
(45) Date of Patent: Jun. 8, 2010

(54) DEVICE FOR PRODUCING AND PROCESSING FOOD

(75) Inventor: Miroslav Domlatil, Reutlingen (DE)

(73) Assignee: Inotec GmbH & Co. Holding und Handels KG, Reutlingen (DE)

( * ) Notice: Subject to any disclaimer, the term of this patent is extended or adjusted under 35 U.S.C. 154(b) by 396 days.

(21) Appl. No.: 11/577,206

(22) PCT Filed: Oct. 24, 2005

(86) PCT No.: PCT/EP2005/011381

§ 371 (c)(1),
(2), (4) Date: Apr. 13, 2007

(87) PCT Pub. No.: WO2006/045568

PCT Pub. Date: May 4, 2006

(65) Prior Publication Data

US 2007/0262183 A1 Nov. 15, 2007

(30) Foreign Application Priority Data

Oct. 25, 2004 (DE) ...................... 10 2004 051 971

(51) Int. Cl.
*B02C 17/16* (2006.01)
*A23K 1/14* (2006.01)

(52) U.S. Cl. .................................... 241/82.1; 241/82.5

(58) Field of Classification Search ........ 241/82.1–82.7
See application file for complete search history.

(56) References Cited

U.S. PATENT DOCUMENTS

| | | | | |
|---|---|---|---|---|
| 1,695,898 A | | 12/1928 | Laemmel | |
| 5,251,829 A | * | 10/1993 | Lesar | 241/30 |
| 5,443,214 A | * | 8/1995 | Lesar | 241/82.2 |
| RE35,048 E | * | 10/1995 | Rudibaugh | 241/65 |

FOREIGN PATENT DOCUMENTS

| | | |
|---|---|---|
| DE | 28 21 930 | 11/1979 |
| DE | 39 15 409 | 11/1990 |
| DE | 44 37 144 | 4/1996 |
| JP | 3-217255 | 9/1991 |

* cited by examiner

*Primary Examiner*—Faye Francis
(74) *Attorney, Agent, or Firm*—Bachman & LaPointe, P.C.

(57) ABSTRACT

A device for producing and processing food, in particular meat, includes at least one perforated plate (P) having holes through which the food can be pressed. The perforated plate, (P) is made of two parts, for example, a carrier and an insert, and a press element, for example, a blade which is guided along the insert, is associated with the insert. The insert deviates, in a minimal manner, with heat arising between the insert and the press element.

6 Claims, 2 Drawing Sheets

DEVICE FOR PRODUCING AND PROCESSING FOOD

BACKGROUND OF THE INVENTION

The invention relates to a device for the manufacture or processing of foodstuffs, in particular meat, having at least one perforated plate, through the holes of which the foodstuff is capable of being pressed, in conjunction with which a knife in a knife carrier with a cutting edge traveling along it is allocated to the perforated plate.

A device of this kind is already familiar under the designation of a grinder, for example. The perforated plate is present inside a housing, in conjunction with which, for example, a plurality of perforated plates can be connected one after the other, for example as depicted in DE 39 15 409 A1. Arranged ahead of each perforated plate is a rotating knife, which knives scrape across the perforated plate and/or an insert in the perforated plate with their blades and in so doing comminute the meat and press it through the holes in the perforated plate.

Perforated plates consisting of two parts have already existed for some time. For example, a perforated plate consisting of a carrier plate and a hardened steel plate inserted therein is described in U.S. Pat. No. 1,695,898. In JP 3,217,255 A, a ceramic plate is applied to a carrier plate. A ceramic material is also used here for the knife blade.

The manufacture of the perforated disk and/or the knife completely from a ceramic material, or the manufacture of the knife and the perforated disk from a metal and the coating of the surfaces of the perforated disk and/or the knife with a ceramic material, is previously disclosed in DE 28 21 930 C1.

A knife which consists in its entirety of a ceramic material is disclosed, for example, in JP 3217255 A. A knife of this kind is exceptionally expensive and delicate, however. It is very hard, and as such it is also sensitive to shocks. The high hardness must be achieved at the expense of the stability of the cutting edge, because the greater hardness is also associated with greater brittleness of the material.

A device of the above-mentioned kind is previously disclosed in DE 44 37 144 A1. The knife in this case consists of a blade insert and a blade. The blade is held in the blade insert, which is itself made of plastic. The blade insert itself is guided in a readily movable and readily tiltable fashion within an axial opening of a wing, in order to permit complete contact by the blades on the perforated disk under the effect of the operating pressure of the product to be cut up.

SUMMARY OF THE INVENTION

The object of the present invention is to develop a device of the above-mentioned kind, with which the quality of the manufactured product is improved and its transport through the perforated plates is simplified, the individual parts are still capable of being manufactured economically, and wear in the knives is reduced.

In providing a solution to the object, the knife on the one hand exhibits a clamping insert for securing a blade made of a ceramic material, and the blade exhibits at least one lateral supporting surface, which is oriented more or less in the plane of the cutting edge.

This means that the knife is of multi-part configuration, and the clamping insert can consist of metal, for example. This has the advantage that the knife can be manufactured considerably more economically without the need to relinquish the advantages of ceramic material.

If only a part of the knife, for example according to the present invention, and in particular the part that does not interact with an attachment element on the knife carrier, is made of a ceramic material, these disadvantages are overcome. It is possible to manufacture less expensive blades from ceramic material with an associated lower shock sensitivity of the cutting edge.

The blade preferably consists of zirconium oxide.

One particular characterizing feature is aimed at providing the blade with at least one lateral supporting surface, which is oriented more or less in the plane of the cutting edge and in the operating position in the plane of the perforated plate. This supporting surface lies outside the perforations of the perforated plate and slides on these perforation-free areas. This ensures that the cutting edge of the blade does not adopt an excessively fixed position in relation to the perforated plate, so that minor irregularities in the perforated plate are also not capable of causing damage to the cutting edge.

In a preferred illustrative embodiment of the invention, the clamping insert is penetrated by a tension bolt, which presses the clamping insert in a slot in the knife carrier against the blade and presses this against a slot wall. This means that the blade made of a ceramic material does not interact with an attachment element, so that no weakening of the blade is caused here, too, for example by a hole or in particular by a threaded hole.

The insertion of the knife, consisting of a clamping insert and a blade, is facilitated in the sense that the clamping insert and the blade together constitute a unit to a certain extent, which can be inserted from a wing tip of the knife carrier into a corresponding slot. For this purpose, the clamping insert forms an edge bead, into which the blade is inserted. In order to prevent lateral displacement of the blade, centering spigots project from the clamping insert into this edge bead, which are able to engage in corresponding centering openings in the blade.

Clamping also has the considerable advantage that the ceramic blade and the ceramic cutting edge do not need to be so dimensionally accurate. In other words, no expensive machining of the blade is required in order for it to seat accurately in the slot. This reduces the cost of the blade significantly.

A further improvement in the operation of the knife and the location of the knife in the slot is also made possible by the special embodiment of the surface of the wing, in which the knife is seated. The idea of the invention relates to the fact that an area of the surface of the wing in the direction of rotation ahead of the wing and/or the cutting edge is situated at a greater distance from this than it is after the knife. This gap is bridged, moreover, by a free end edge of the clamping insert, which is inclined in relation to the surface of the knife carrier. In this way, the meat is also pressed from a broader area into a narrower area ahead of the cutting edge, so that the action of the cutting edge is improved.

When a knife blade of the kind mentioned above scrapes across the perforated plate in a previously disclosed grinder and cuts the product, for example, heat is generated and is conducted away as a rule both via the knife and via the perforated plate. According to the present invention, this conduction of heat should be largely avoided, so that the heat is absorbed into the product. The protein structure is significantly improved as a result in the case of a meat grinder, for example, which in turn leads to an improvement in the product as a whole. It has emerged in practice that a thermal input of 2° C. and more into the product can be achieved in this way.

In the context of the invention, it is envisaged on the one hand that the insert and/or the press element will exhibit low thermal conductivity. An appropriate material is available for this application. For example, the insert could consist of a ceramic material, the thermal conductivity of which is extremely low. Knife blades made of ceramic materials already exist, however, which find a particular application in surgery and also exhibit low thermal conductivity.

Consideration can also be given, however, separately or in conjunction with the choice of material, to the possibility of insulating the insert from the carrier and/or also insulating the knife from its carrier. Any form of insulating layer is suitable in this case. For example, the adhesive that attaches the insert to the carrier can also be used as an insulating layer between the insert and the carrier.

Mention can also be made of the extreme resistance to wear in the case of a ceramic material being used for the insert, and the same is true of the use of a ceramic material for the knife blade.

Further attention should be paid to the configuration of the holes in the perforated plate. It has been established that a significantly better transport of the product is achieved through holes which expand in a direction away from the inlet orifice, as this no longer results in blocking of the holes.

The manner in which the expansion takes place should be of secondary importance. For example, one or more steps can be introduced into the holes by laser cutting, although the possibility still exists of configuring the holes in such a way that they expand conically. Many possibilities, which should be covered by the present invention, present themselves in this respect.

A further aspect of the invention relates to the configuration of the knife. This knife should consist of a clamping insert and a blade. In other words, the knife is of two-part execution, and the clamping insert can consist of metal, for example. This has the advantage that the knife can be manufactured significantly more economically without the need to relinquish the advantages of ceramic material.

A knife which consists in its entirety of a ceramic material is disclosed, for example, in JP 3217255 A. A knife of this kind is exceptionally expensive and delicate, however. It is very hard, and as such it is also sensitive to shocks. The high hardness must be achieved at the expense of the stability of the cutting edge, because the greater hardness is also associated with greater brittleness of the material. However, if only a part of the knife, for example according to the present invention, and in particular the part that does not interact with an attachment element on the knife carrier, is made of a ceramic material, these disadvantages are overcome. It is possible to manufacture less expensive blades from ceramic material with a lower shock sensitivity of the cutting edge.

The blade preferably consists of zirconium oxide.

One particular characterizing feature is aimed at providing the blade with at least one lateral supporting surface, which is oriented more or less in the plane of the cutting edge and in the operating position in the plane of the perforated plate. This supporting surface lies outside the perforations of the perforated plate and slides on these perforation-free areas. This ensures that the cutting edge of the blade does not adopt an excessively fixed position in relation to the perforated plate, so that minor irregularities in the perforated plate are also not capable of causing damage to the cutting edge.

In a preferred illustrative embodiment of the invention, the clamping insert is penetrated by a tension bolt, which presses the clamping insert in a slot in the knife carrier against the blade and presses this against a slot wall. This means that the blade made of a ceramic material does not interact with an attachment element, so that no weakening of the blade is caused here, too, for example by a hole or in particular by a threaded hole.

The insertion of the knife, consisting of a clamping insert and a blade, is facilitated in the sense that the clamping insert and the blade together constitute a unit to a certain extent, which can be inserted from a wing tip of the knife carrier into a corresponding slot. For this purpose, the clamping insert forms an edge bead, into which the blade is inserted. In order to prevent lateral displacement of the blade, centering spigots project from the clamping insert into this edge bead, which are able to engage in corresponding centering openings in the blade.

Clamping also has the considerable advantage that the ceramic blade and the ceramic cutting edge do not need to be so dimensionally accurate. In other words, no expensive machining of the blade is required in order for it to seat accurately in the slot. This reduces the cost of the blade significantly.

A further improvement in the operation of the knife and the location of the knife in the slot is also made possible by the special embodiment of the surface of the wing, in which the knife is seated. The idea of the invention relates to the fact that an area of the surface of the wing in the direction of rotation ahead of the wing and/or the cutting edge is situated at a greater distance from this than it is after the knife. This gap is bridged, moreover, by a free end edge of the clamping insert, which is inclined in relation to the surface of the knife carrier. In this way, the meat is also pressed from a broader area into a narrower area ahead of the cutting edge, so that the action of the cutting edge is improved.

BRIEF DESCRIPTION OF THE DRAWINGS

Further advantages, characterizing features and details of the invention can be appreciated from the following description of a preferred illustrative embodiment and with reference to the drawing, in which.

DETAILED DESCRIPTION

Figures 1, 2, 3:
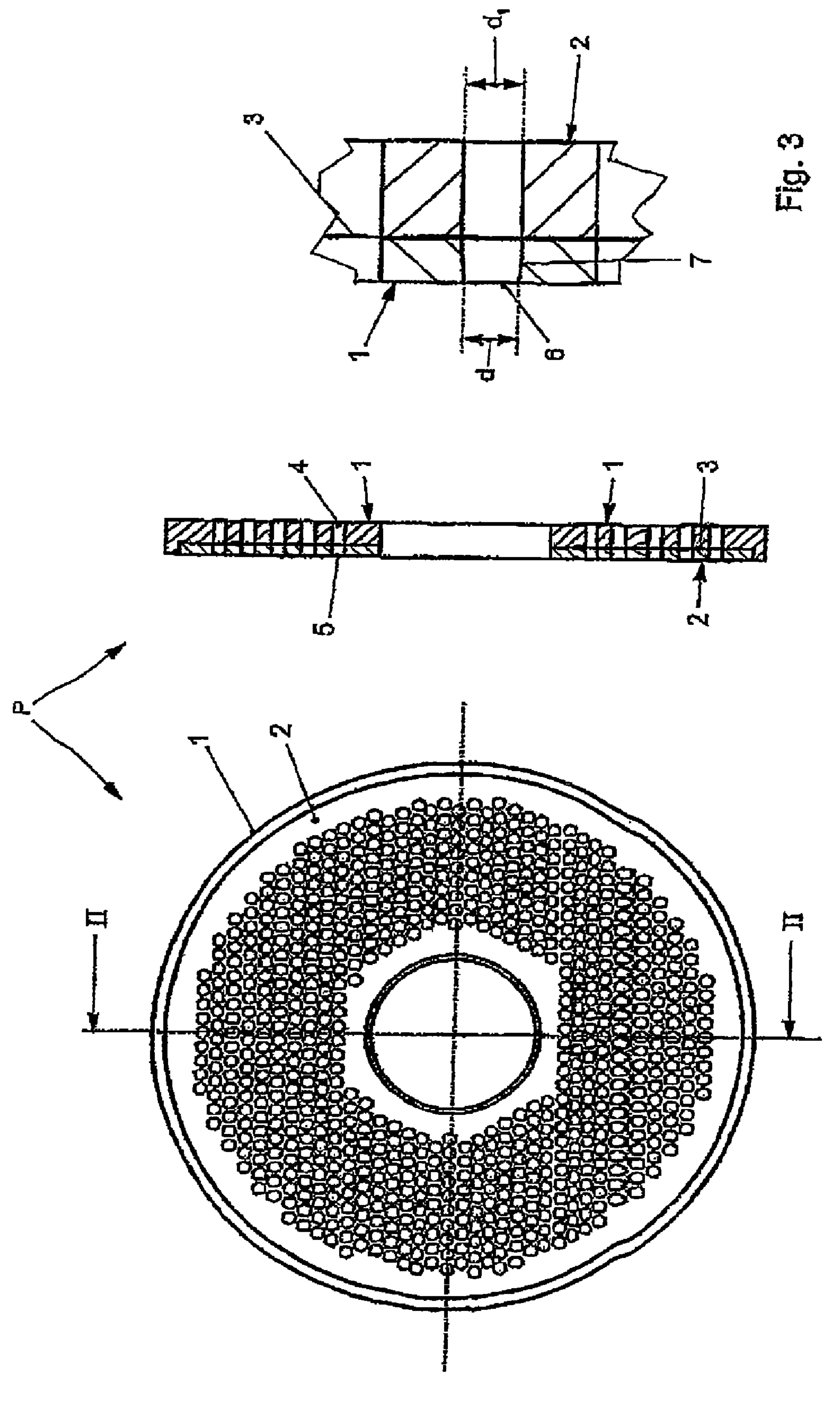
FIG. 1 depicts a view from above of a perforated plate according to the invention intended for use in a device for the manufacture or processing of meat in particular.
FIG. 2 depicts a cross section through the perforated plate according to FIG. 1 along the line II-II.
FIG. 3 depicts a detail shown on an enlarged scale of the cross section according to FIG. 2 in the encircled area.

According to FIGS. 1 and 2, a perforated plate P according to the invention consists of a carrier 1 and an insert 2. The insert 2 in this case is introduced into the carrier 1, and it is insulated there against the carrier 1 by means of an insulating layer 3. This insulating layer 3 can be a layer of adhesive, for example.

The carrier 1 exhibits holes 4, which coincide with holes 5 in the insert 2. In this case, the holes 5 in the insert 2 possess an inlet orifice 6 with a diameter d. Executed downstream of the inlet orifice 6 in the hole 5 is an expanding step 7, through which the diameter d is expanded to a diameter $d_1$, in conjunction with which the holes 4 in the carrier 1 possess this diameter $d_1$.

Figure 4:
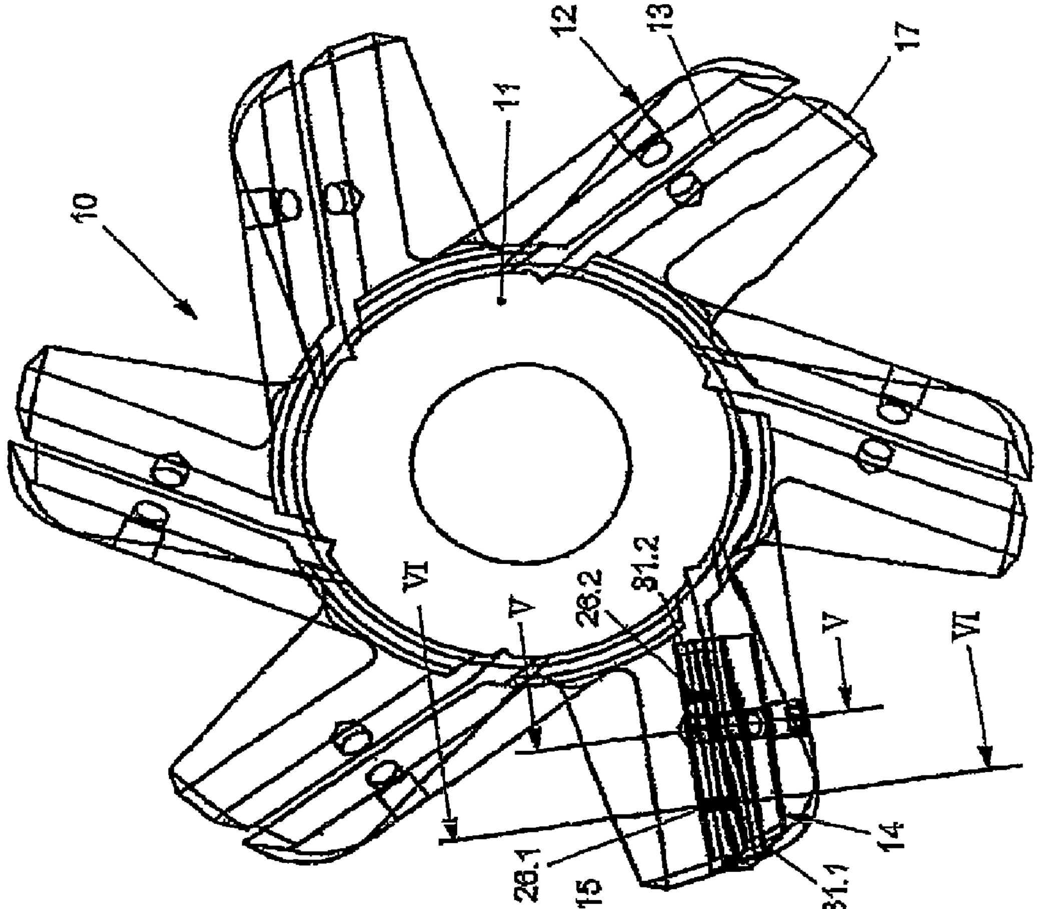
FIG. 4 depicts a view from above of a knife carrier according to the invention.
Figure 5:
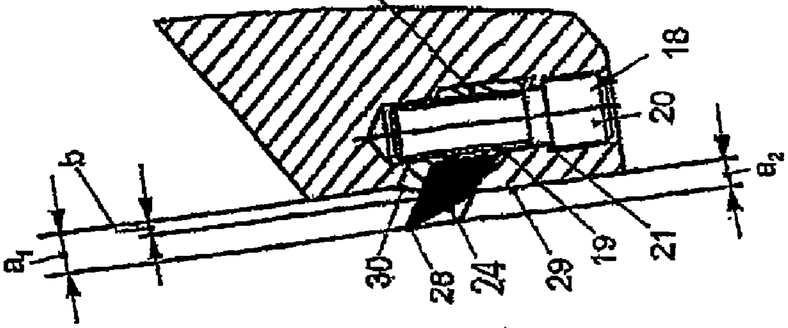
FIG. 5 depicts a cross section shown on an enlarged scale through an area of the knife carrier according to FIG. 4 along the line V-V.
Figure 6:
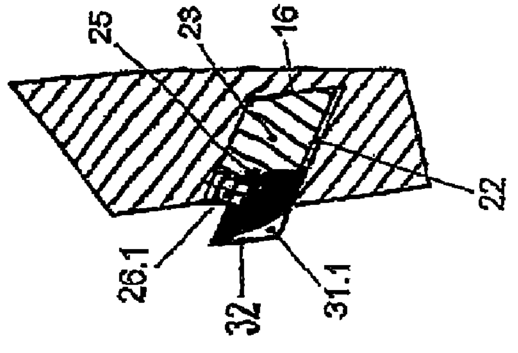
FIG. 6 depicts a cross section shown on an enlarged scale through the knife carrier according to FIG. 4 along the line VI-VI.

In the case of a comminuting machine or a meat grinder, a knife carrier 10 is allocated as a rule to the perforated plate P, as described in greater detail in relation to FIGS. 4 to 6. This knife carrier 10 exhibits a disk 11, from which a plurality of wings 12 projects. Formed in each wing 12 is a slot 13, which accommodates a knife 14. The slot 13 and the knife 14 are oriented radially to tangentially in relation to the disk 11.

According to the present invention, the slot 13 should exhibit a slot base 15 oriented in a more or less linear direction, in conjunction with which the knife 14 also possesses a straight base 16. The knife 14 is inserted into the slot 13 starting from a wing tip 17 and is retained by a tension bolt 18. This tension bolt 18 passes through a part of the wing 12 and a threaded hole 19 in the knife 14. Since a head 20 of the tension bolt 18 makes contact with a shoulder 21 in the wing 12, further rotation of the tension bolt 18 causes the knife 14 to be tightened against a slot wall 22. Since the knife 14 consists of two parts, namely a clamping insert 23 made of metal and a blade 24 made of a ceramic material, tightening of the tension bolt 18 causes the blade 24 to be retained between the clamping insert 23 and the slot wall 22.

In order to facilitate insertion of the knife 14 into the slot 13, the clamping insert 23 and the blade 24 should constitute an easily handled unit. For this purpose, an edge bead 25 is executed in the clamping insert 23, in which edge bead the blade 24 is seated. The blade is centered in the edge bead 25 by two spigots 26.1 and 26.2.

It can also be appreciated from FIG. 5 that a surface area 27 of the wing 12 assumes a greater distance $a_1$ from a cutting edge 28 of the blade 24 than a further surface area 29 in the direction of rotation of the knife carrier 10 after the knife 14. This difference b is bridged by an end edge 30 of the clamping insert 23.

Furthermore, protecting surfaces 31.1 and 31.2 are preferably provided to either side of the cutting edge 28 on the blade 24, which surfaces prevent the cutting edge 28 from sitting directly on the perforated plate P. These supporting surfaces 31.1 and 31.2 are oriented with a free edge 32 in the plane of the surface of the perforated plate and in areas outside the holes of the perforated plate P.

The invention claimed is:

1. A device for processing foodstuffs comprising: a perforated plate having a carrier portion which receives an insert portion, the carrier portion and the insert portion each being provided with a plurality of aligned throughholes for the passage of processed foodstuffs; an insulating layer provided between the carrier portion and the insert portion; the insert portion is formed of a ceramic material; a knife carrier provided adjacent the insert portion, the knife carrier includes at least one slot for receiving a knife having a cutting edge which travels along the insert portion when the knife carrier is rotated relative to the perforated plate, the knife comprises a clamping insert made of metal adapted to be held in the at least one slot and a blade element made of ceramic includes the cutting edge which contacts the insert portion, the blade includes a supporting surface on either side of the cutting edge, each of the supporting surfaces are oriented with a free edge in a section of the insert portion which is free of holes.

2. The device as claimed in claim 1, wherein the blade consists of zirconium oxide.

3. The device as claimed in claim 1, wherein the clamping insert is penetrated by a tension bolt which presses the clamping insert in the slot of the knife carrier against the blade and presses the blade against a slot wall.

4. The device as claimed in claim 3, wherein the clamping insert constitutes an edge bead for the blade, in the area of which centering spigots for the blade are provided.

5. The device as claimed in claim 1, wherein a distance ($a_1$) of the cutting edge from a surface area of the knife carrier in the direction of rotation is larger in front of the knife than a distance ($a_2$) behind the knife.

6. The device as claimed in claim 5, wherein a free end edge of the clamping insert is inclined in relation to the surface of the knife carrier so that it is inclined upwards from the surface area ahead of the knife towards a surface area behind the knife.

* * * * *